United States Patent [19]

Bryant et al.

[11] Patent Number: 4,638,469

[45] Date of Patent: Jan. 20, 1987

[54] MECHANICAL SPACER FOR TOWED ACOUSTIC ARRAY

[75] Inventors: Michael J. Bryant; Frank R. Attenborough, both of Kent; Christopher G. Sykes, Medstead; Neil W. Cameron, London, all of England

[73] Assignee: Britoil Public Limited Company, Glasgow, Scotland

[21] Appl. No.: 611,976

[22] Filed: May 18, 1984

[30] Foreign Application Priority Data

May 18, 1983 [GB] United Kingdom ............... 8313796

[51] Int. Cl.$^4$ .......................... G01V 1/38; H02G 7/12
[52] U.S. Cl. .................................. 367/154
[58] Field of Search ............... 174/146, 99 R, 99 B; 367/153, 154, 20; D8/354; 138/112, 113

[56] References Cited

U.S. PATENT DOCUMENTS

| D. 219,768 | 1/1971 | Conwill | D8/354 |
| 3,463,870 | 8/1969 | Eucker | 174/42 |
| 3,476,868 | 11/1969 | Williams et al. | 174/146 |
| 3,978,276 | 8/1976 | Poffenberger | 174/42 |
| 4,178,467 | 12/1979 | Hawkins | 174/146 |

FOREIGN PATENT DOCUMENTS

| 570000 | 6/1945 | United Kingdom . |
| 1011540 | 12/1965 | United Kingdom . |
| 1238798 | 7/1971 | United Kingdom . |
| 1551762 | 8/1979 | United Kingdom . |
| 2023943 | 1/1980 | United Kingdom . |

Primary Examiner—Thomas H. Tarcza
Assistant Examiner—Ian J. Lobo
Attorney, Agent, or Firm—Kerkam, Stowell, Kondracki & Clarke

[57] ABSTRACT

A mechanical spacer for locating electrical cables and strain ropes within the outer sheath of a towed acoustic array. The spacer has arcuate strip sections 10 joined by intervening portions 11 which form radially outwardly facing U-shaped recesses 12. Electrical cables are laid loosely in the center part of the spacer, located if required by projecting support webs 15. Strain ropes are secured in the recesses 12 by spring clips (not shown). Resilient tubular structures 14 are formed on the web sections 10 to locate the spacer within the towed array sheath 20.

3 Claims, 6 Drawing Figures

MECHANICAL SPACER FOR TOWED ACOUSTIC ARRAY

This invention relates to a mechanical spacer for a towed acoustic array, such as is used in a so-called "seismic streamer".

A typical towed acoustic array comprises a long flexible tube, e.g. of PVC, in which a set of hydrophones are placed at spaced intervals. Conventionally the hydrophones are spaced by being affixed to a strain member(s), e.g. wire rope(s) and are electrically connected to a wiring harness, both the strain member(s) and the electrical wiring passing down the inside of the tube. Because the hydrophones may be spaced apart at considerable distances, in relation to the tube diameter, it is customary to include one or more spaces in between successive hydrophones to prevent the strain member(s) and electrical wires from becoming twisted and entangled. The tube is also generally filled with a filling liquid of predetermined specific gravity to provide the completed structure with a required buoyancy in order that when towed it will attain and maintain a given depth in the water.

A known form of mechanical spacer for towed acoustic arrays is in the shape of a "doughnut", i.e. an anchor-ring, having a central aperture through which a strain wire is threaded and a number of equi-angularly spaced apertures disposed near the outer diameter through which electrical wires are threaded, the spacer being secured to the strain wire and to the electrical wires to prevent longitudinal movement therebetween. Such a spacer is difficult to assemble together with its strain wire and electrical wiring within the tube. Moreover, when assembled it restricts the ready flow of liquid down the tube when filling and emptying the array. Also it generates undesirable acoustic reflections within the tube due to the fact that it almost completely blocks the tube.

The present invention provides a mechanical spacer for a towed acoustic array comprising a number of angularly spaced arcuate single strip sections joined together by intervening portions forming radially outwardly facing U-shaped recesses between the ends of adjacent strip sections, the parallel inner walls of each U-shaped recess being shaped to accept fastening means whereby a rope or like strain member can be secured in the base of the U-shaped recess, the arcuate strip sections each being provided with one or more radially outwardly resilient protrusions.

In an alternative embodiment the arcuate strip sections are each formed with one or more radially inwardly protruding locating means for locating and securing in the centre of the spacer an electronic equipment module.

Embodiments of the invention will now be described with reference to the accompanying drawings, in which.

Figure 1:
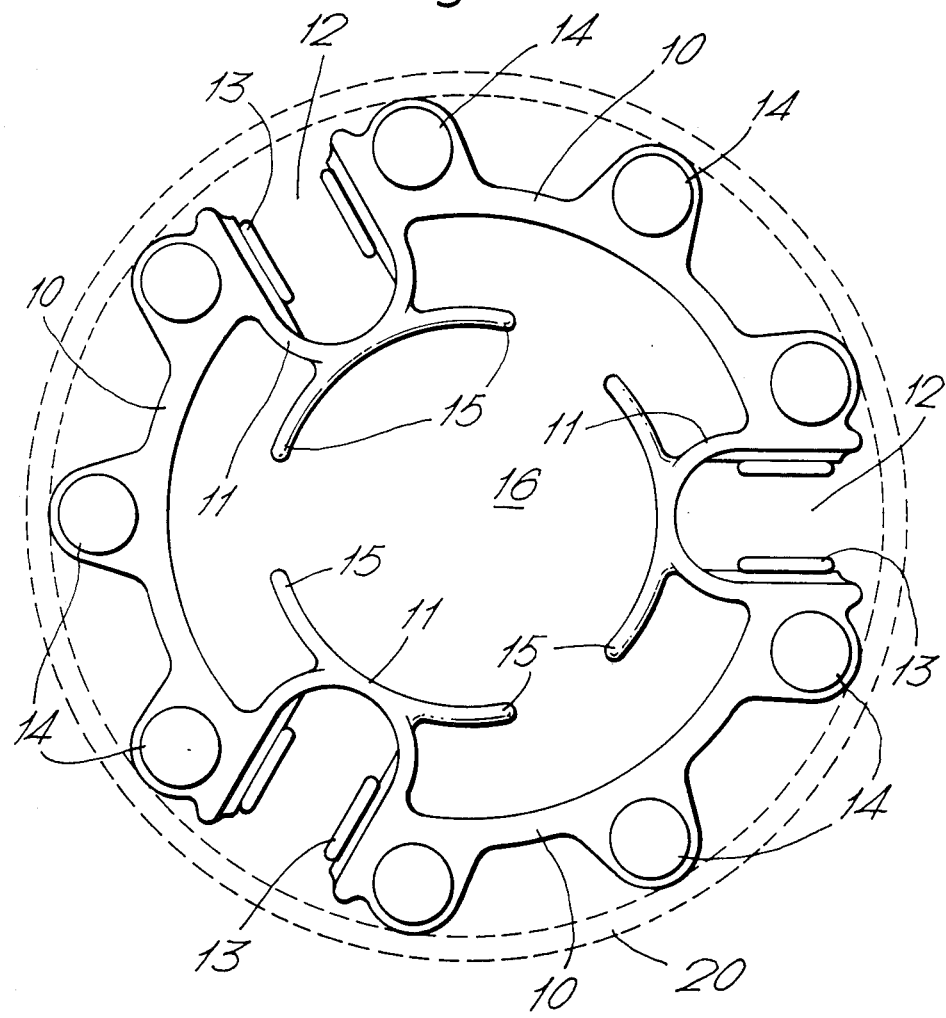
FIG. 1 is an end view of a spacer.
Figure 2:
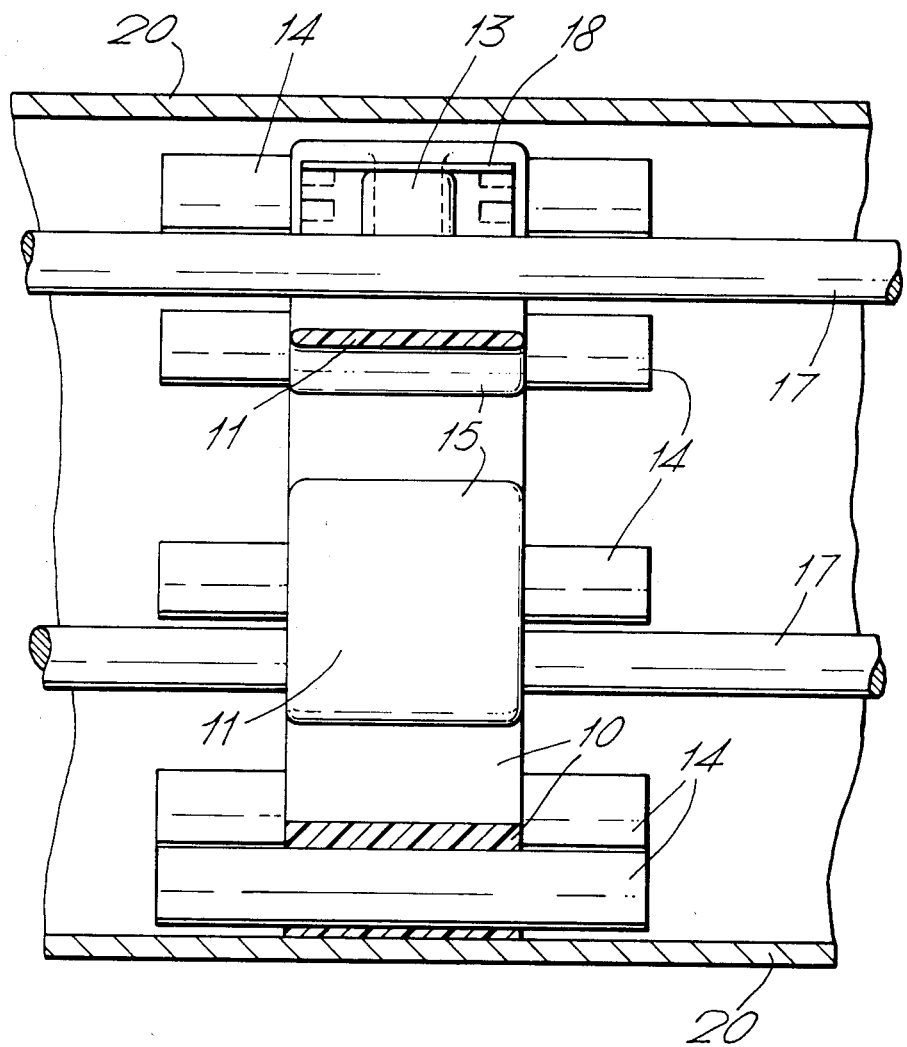
FIG. 2 is a part section view of the spacer of FIG. 1.
Figure 3:
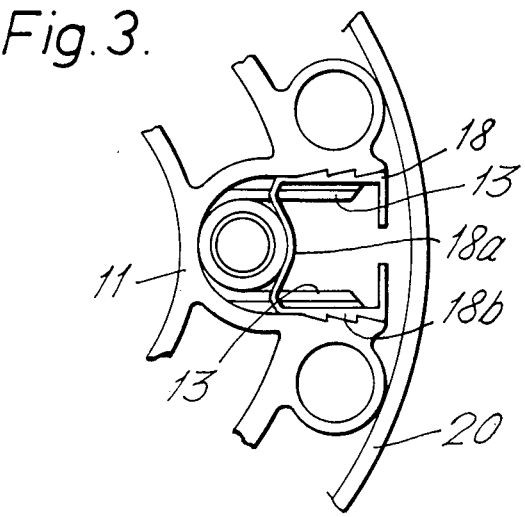
FIG. 3 illustrates a detail of FIG. 1 showing security of a strain member.
Figure 4:
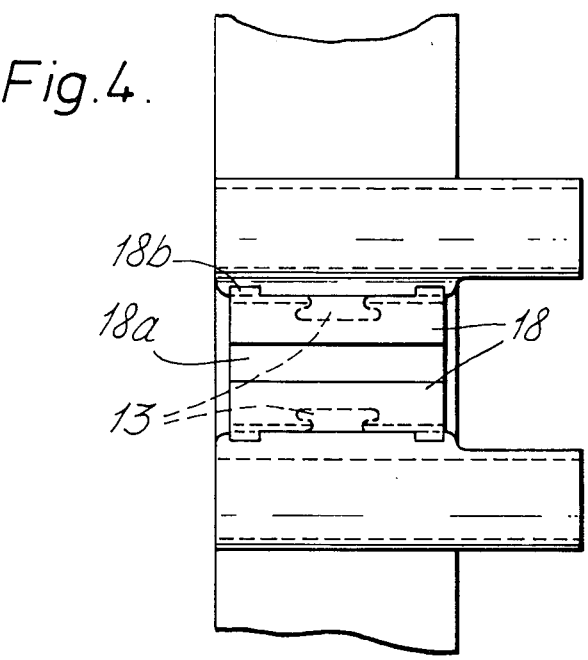
FIG. 4 is another view of the detail of FIG. 3.

The spacer of FIGS. 1–4 is a plastics moulding comprising three arcuate strip sections 10 joined together by intervening portions 11 which form radially outwardly facing U-shaped recesses 12 between the strip sections 10. The parallel inner walls of the recesses 12 are shaped with dovetail ridges 13. Around the outer surfaces of the strip sections there are formed a number of resilient protrusions 14, each being in the shape of a hollow tube-like structure having a comparatively thin wall section at its point furthermost from the centre of the spacer. The portion 11 forming the base of each U-shaped recess has two arcuate support webs 15 projecting therefrom.

In use a bunch of spacers are stacked together and loosely threaded with electrical cables passing down the centre space 16. The cables can then be drawn together with three Kevlar strain members not threaded through the stack of spacers. At intervals, the three Kevlar ropes 17 are dropped one each into a respective U-shaped recess and a spring metal clip 18 is inserted into the recess to secure the spacer to the rope. The metal clips are W-shaped, the base 18a of the W passing on the rope and, in cooperation with the base of the recess, gripping the rope. The legs of the W have slots which engage the dovetail ridges B in the recess as the metal clips are pushed home, thus preventing the clips from being dislodged by any strain on the rope. The legs of the W also have sharp tines 18b which engage the walls of the recess to secure the clip under pressure against the rope. The loosely threaded electrical cables can then be caught up between one of the support webs 15 and the web portions 10. When the spacer has been secured to all three Kevlar ropes that section of the completed cable/rope assembly can be drawn into the plastics hose. The dimensions of the hose 20 (shown in dotted outline) and the outer diameter of the spacer are such that the spacer is a close fit in the hose.

The spacer thus fitted in place secures the strain members and electrical cables in parallel relation to the plastics hose. It presents little acoustic reflection and, being such an open structure, allows easy filling and emptying of the hose by a filling liquid or gel to achieve the desired net buoyancy.

Figure 5:
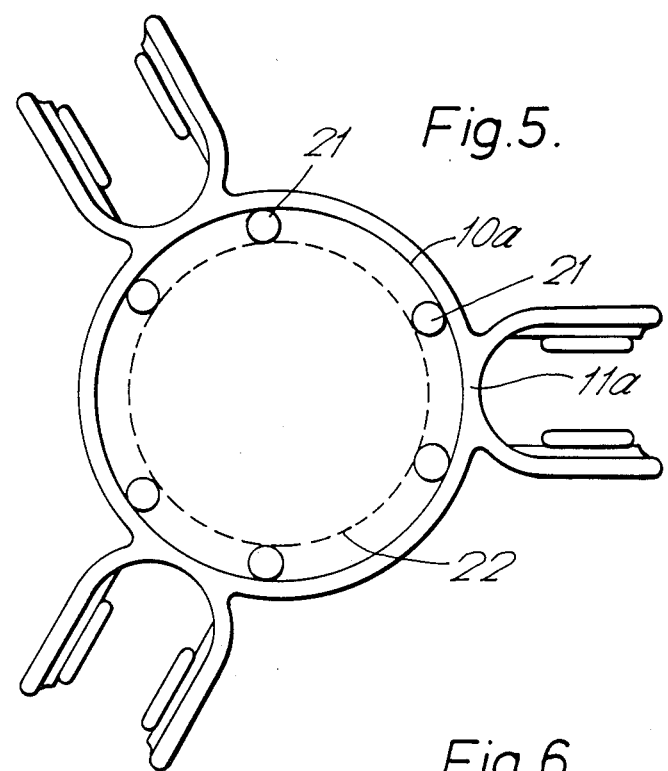
FIG. 5 is an end view of an alternative spacer to that of FIG. 1.
Figure 6:
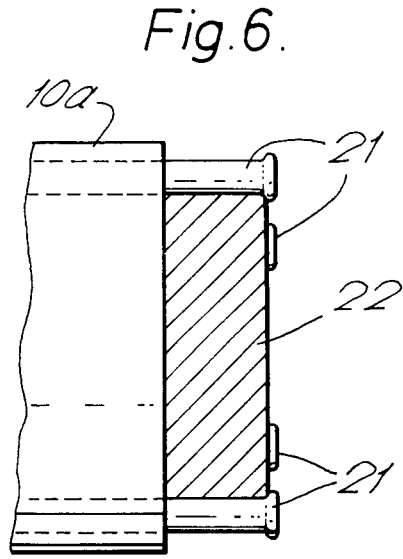
FIG. 6 illustrates a partial detail of the spacer of FIG. 5.

At intervals along the seismic array additional spacers of the type shown in FIGS. 5 and 6 can be inserted. These spacers do not have any electrical cables threaded through them, so they can be simply inserted into the array with the three Kevlar ropes being dropped into the recesses and secured by metal clips. The three arcuate strip sections 10a together with the joining portions 11a make a closed circle and the web portions 11a are provided with rod-like members 21 which are a close fit on a hydrophone casing 22 (shown in dotted outline in FIG. 5). The ends of the plastic rods can be simply deformed by being brought briefly into contact with a hot iron so that, as shown in FIG. 6, they secure the casing 22 from longitudinal movement in the spacer. The electric cables are allowed to be in the outer spaces between the recesses 12. If the hydrophone spacer is placed between two other closely spaced spacers of the first type then, when the Kevlar ropes are kept in tension during towing, the hydrophone spacer will be maintained out of contact with the hose wall. The hydrophone will not then be subject to mechanical noise generated by contact between its supporting spacer and the hose. The only acoustic signals the hydrophone will receive will be those transmitted from the surrounding sea water through the hose wall and the filling liquid or gel in contact with the hydrophone.

To assist the gripping of the Kevlar rope in the U-shaped recess, the rope may be encased in resilient material, and the base of the U-shaped recess may be formed with a ridge across the line of the rope. When compressed into a recess by the metal clip the resilient material is indented by the transverse ridge. The base of the W-shaped clip may also have holes punched through it so that some of the compressed resilient material deforms through the holes, thus providing extra grip.

The spacers of FIGS. 5 and 6 can carry instead of hydrophones other electronic component modules, e.g. telemetry instrumentation.

We claim:

1. A mechanical spacer for a towed acoustic array comprising a number of angularly spaced arcuate single strip sections joined together by intervening portions forming radially outwardly facing U-shaped recesses between the ends of adjacent strip sections, the parallel inner walls of each U-shaped recess being shaped to accept fastening means whereby a rope or like strain member can be secured in the base of the U-shaped recess, the arcuate strip sections each being provided with one or more radially outwardly resilient protrusions, each protrusion being in the shape of a hollow tube-like structure having a thin resilient wall section at its point furthermost from the center of the spacer.

2. A spacer according to claim 1 wherein the bases of the U-shaped recesses each are provided with arcuate support webs projecting therefrom for electrical conductors passing through the central space of the spacer.

3. A spacer according to claim 1 wherein the arcuate strip sections are each formed with one or more radially inwardly protruding locating means for locating and securing in the centre of the spacer an electronic equipment module.

* * * * *